(12) United States Patent
Sørensen et al.

(10) Patent No.: US 9,770,877 B2
(45) Date of Patent: Sep. 26, 2017

(54) ROLLER SYSTEM ADAPTED TO BE USED IN RELATION TO A FLATTENING APPARATUS FOR FLATTENING FOODSTUFF

(71) Applicant: Marel A/S, Aarhus N (DK)

(72) Inventors: Anders Sørensen, Rønne (DK); Tomas Finne Nielsen, Rønne (DK)

(73) Assignee: MAREL A/S, Arhus N (DK)

( * ) Notice: Subject to any disclaimer, the term of this patent is extended or adjusted under 35 U.S.C. 154(b) by 203 days.

(21) Appl. No.: 14/418,647

(22) PCT Filed: Aug. 19, 2013

(86) PCT No.: PCT/DK2013/000050
§ 371 (c)(1),
(2) Date: Jan. 30, 2015

(87) PCT Pub. No.: WO2014/026690
PCT Pub. Date: Feb. 20, 2014

(65) Prior Publication Data
US 2015/0174845 A1    Jun. 25, 2015

Related U.S. Application Data

(60) Provisional application No. 61/684,208, filed on Aug. 17, 2012.

(30) Foreign Application Priority Data

Aug. 17, 2012   (EP) .................................... 12180873
Nov. 28, 2012   (DK) ................................. 2012 70737

(51) Int. Cl.
*B30B 5/06*    (2006.01)
*A22C 9/00*    (2006.01)

(52) U.S. Cl.
CPC ............... *B30B 5/06* (2013.01); *A22C 9/004* (2013.01); *A22C 9/007* (2013.01)

(58) Field of Classification Search
CPC ........... B30B 5/06; A22C 9/004; A22C 9/007
See application file for complete search history.

(56) References Cited

U.S. PATENT DOCUMENTS

| 311,199 A | * | 1/1885 | Moulton | ................ | A22C 9/008 |
| | | | | | 452/142 |
| 6,672,202 B2 | | 1/2004 | Völkl | | |

(Continued)

FOREIGN PATENT DOCUMENTS

| CN | 1231829 A | 10/1999 |
| DE | 3538903 C1 | 1/1987 |

(Continued)

OTHER PUBLICATIONS

International Search Report; International Application No. PCT/DK2013/000050; Date of Actual Completion of International Search: Sep. 26, 2013; Date of Mailing of International Search Report: Jul. 10, 2013.

*Primary Examiner* — Jimmy T Nguyen
*Assistant Examiner* — Joseph Finan, Jr.
(74) *Attorney, Agent, or Firm* — Pearne & Gordon LLP

(57) ABSTRACT

A flattening apparatus with a roller system including an impact resistant system and a first conveyor belt facing and arranged opposite to the impact resistant system and having a flattening area between the first conveyor belt and the impact resistant system. The roller system is rotatable mounted adjacent to the first conveyor belt distally away from the impact resistant system across the first conveyor belt. Foodstuff is flattened and compressed by rotating the roller system while conveying the foodstuff through the flattening area such that an outwardly protruding surface structure presses the first conveyor belt towards the impact (Continued)

resistant system. The surface structure is askew in relation to the longitudinal axis of the roller system and is designed with a portion provided in contact with the first conveyor belt at all times during rotation of the roller system.

9 Claims, 7 Drawing Sheets

(56) References Cited

U.S. PATENT DOCUMENTS

| | | |
|---|---|---|
| 2003/0121420 A1 | 7/2003 | Volkl |
| 2007/0254578 A1 | 11/2007 | Stewart et al. |
| 2011/0009251 A1* | 1/2011 | Derscheid ............... A01F 15/18 492/30 |

FOREIGN PATENT DOCUMENTS

| | | |
|---|---|---|
| DE | 10212881 A1 | 10/2003 |
| EP | 0930015 A2 | 7/1999 |
| EP | 1338203 A1 | 8/2003 |
| EP | 1542540 A | 6/2005 |

* cited by examiner

ROLLER SYSTEM ADAPTED TO BE USED IN RELATION TO A FLATTENING APPARATUS FOR FLATTENING FOODSTUFF

CROSS-REFERENCES TO RELATED APPLICATIONS

This application is the national phase of International Application No. PCT/DK2013/000050 filed on Aug. 19, 2013, which claims the benefit of priority to European Patent Application No. EP12180873.7 filed on Aug. 17, 2012, U.S. patent application No. 61/684,208 filed on Aug. 17, 2012 and Danish Patent Application No. PA 2012 70737 filed on Nov. 28, 2012. The entire disclosures thereof are incorporated herein by reference.

FIELD OF THE INVENTION

The present invention relates to a roller system and roller system assembly comprising at least one outwardly protruding surface structure adapted to be used in relation to a flattening apparatus for flattening foodstuff. Moreover, the invention relates to a flattening apparatus comprising such a roller system.

BACKGROUND OF THE INVENTION

It has always been known that pieces of meat are flattened, in particular if they are to be processed in schnitzel form. On the one hand, this flattening operation is carried out with the aim of increasing the size of the pieces of meat while simultaneously reducing the thickness. In addition, the flattening operation causes the meat to become tender. Connective tissue is known to make meat tough. The flattening operation causes the fibrils to be rearranged and the connective tissue between the fibrils to tear. Devices such as disclosed in U.S. Pat. No. 6,672,202 and EP1542540 which, in a manner comparable to the conventional operation of beating the meat, are intended to make it possible for the pieces of meat to be flattened.

FIG. 1 shows graphically such a flattening apparatus 100 for flattening foodstuff 112 such as meat where two roller systems 101, 102 are placed side-by-side adjacent to a lower conveyor belt 108 and where opposite to the two roller systems are rigidly mounted flattening plate structures 103, 104 positioned adjacent to an upper conveyor belt 107 distally away from the roller systems 101, 102. The flattening of the foodstuff 112 is performed by means of conveying the foodstuff via the upper and lower conveyor belts that run in the same direction, while simultaneously rotating the roller systems 101, 102. As depicted in FIG. 2 the roller systems 101, 102 shown in FIG. 1 comprise multiple of straight and parallel outwardly protruding structures 201 with a kind of a depression 202 there between. The roller systems are arranged at a distance from the lower conveyor belt 108 such that when the outwardly protruding structures 201 point upwards as shown in figure 1b they press onto the lower conveyor belt creating an upwardly oriented force 110, 111 and thus a compression of the foodstuff when the foodstuff is positioned between the roller systems and the flattening plates. FIG. 1c depicts the scenario where the depression 202 is facing the lower conveyor belt 108 causing a release from the force/pressure state shown in FIG. 1b. Accordingly, this continuous pressure-release state provides a kind of a massage for the meat where the aim is to make the meat thin and/or larger and/or to provide a displacement of the fibres in the meat to make it more tender.

The disadvantage with this apparatus is however that the apparatus is noisy during the flattening, where the position shown in figure 1b where the outwardly protruding surface structure 201 hits the lower conveyor belt 108 and thus the meat simultaneously, creates loud hammering sound. Even when no foodstuff is present the impact from the outwardly protruding surface structure 201 and the lower conveyor belt 108 creates a noise that can be very irritating for an operator of the apparatus.

The inventor of the present invention has appreciated that there is thus a need for an improved flattening apparatus that creates much less noise than the above mentioned apparatus such that the working conditions for an operator of the apparatus are greatly improved and has in consequence devised the present invention.

SUMMARY OF THE INVENTION

It would be advantageous to achieve an improved flattening apparatus that is capable of flattening foodstuff where the noise reduction is such that the working conditions for an operator of the apparatus are greatly improved. In general, the invention preferably seeks to mitigate, alleviate or eliminate one or more of the above mentioned disadvantages singly or in any combination. In particular, it may be seen as an object of the present invention to provide a roller system and a roller system assembly that is adapted to be used in such a flattening apparatus that solves the above mentioned problems, or other problems, of the prior art.

To better address one or more of these concerns, in a first aspect of the invention a roller system is provided comprising at least one outwardly protruding surface structure, said roller system being adapted to be used in relation to a flattening apparatus for flattening foodstuff, said flattening apparatus comprising:

an impact resistant system, and
a first conveying means including a first conveyor belt, said first conveying means being arranged opposite to said impact resistant system with the first conveyor belt facing said impact resistant system, the area between the first conveyor belt and the impact resistant system defining a flattening area, said roller system being adapted to be rotatable mounted adjacent to said first conveyor belt distally away from said impact resistant system across the first conveyor belt, said flattening of the foodstuff including rotating said roller system while conveying the foodstuff through said flattening area such that said at least one outwardly protruding surface structure presses said first conveyor belt towards said impact resistant system causing a compression of the foodstuff, wherein said at least one outwardly protruding surface structure is askew in relation to the longitudinal axis of the roller system and is designed such that at least a portion of the at least one outwardly protruding surface structure is in contact with the first conveyor belt substantially at all times during rotation of said roller system. Accordingly, the fact the contact between a part of the at least one outwardly protruding surface structure is always present means the sound that would otherwise be formed upon coming into contact with the first conveyor belt and fully releasing the contact with the first conveyor belt, i.e. a way of an "on/off mode" is eliminated. Moreover, the hammering sound formed when the foodstuff is hammered towards the impact resistant system when using a prior art roller, where the outwardly protruding surface structures extend between the opposite end of the roller parallel to the longitudinal axis of the roller, is no longer present. The roller system may comprise one or more rollers or the like, wherein at least one of said one or more rollers may comprise said at least one outwardly protruding surface structure.

In one embodiment, said at least one outwardly protruding surface structure is a single continuous structure designed in a spiral shaped way. This could e.g. be that the spiral turned one way around the roller system where the opposite ends of the spiral are in line with an axis parallel to the longitudinal axis of said roller system, or the spiral might just as well be turned two or more ways around the roller.

In one embodiment, said at least one outwardly protruding surface structure includes two or more separate outwardly protruding surface structures each of which having a first end and a second end, the internal arrangement between adjacent outwardly protruding surface structures being such that a first or a second end of a outwardly protruding surface structure is, in relation to an axis parallel to the longitudinal axis of said roller system, at least in line with a first or a second end of an adjacent outwardly protruding surface structure. In an embodiment, each of said two or more separate outwardly protruding surface structures extend between the opposite ends of said roller system in a parallel way. In another embodiment, said two or more separate outwardly protruding surface structures extend from the opposite ends of said roller system towards the mid-section of said roller system such that, for adjacent outwardly protruding surface structures, a first or a second end of an outwardly protruding surface structure extending from one end of the roller system towards said mid-section is at least in line with a first or a second end of an adjacent outwardly protruding surface structure extending from said mid-section to the opposite end of said roller system.

In one embodiment, said roller system is formed by two or more sub-roller systems each of which comprises a portion of said at least one outwardly protruding surface structure, the two or more sub-roller systems comprising mounting means for mounting the sub-roller systems together so as to form said roller system. Accordingly, an advantageous solution is provided to divide the roller system, especially if the roller system is relatively long, into smaller items for e.g. facilitate the transport of the roller, or e.g. if a part of the roller becomes damaged that only a part of the roller system needs to be replaced.

According to a second aspect of the invention a flattening apparatus is provided for flattening foodstuff, said flattening apparatus comprising:
  an impact resistant system,
  a first conveying means including a first conveyor belt, said first conveying means being arranged opposite to said impact resistant system with the first conveyor belt facing said impact resistant system, the area between the first conveyor belt and the impact resistant system defining a flattening area, and
  at least one roller system comprising at least one outwardly protruding surface structure , said at least one roller system being rotatable mounted adjacent to said first conveyor belt distally away from said impact resistant system across the first conveyor belt, said flattening of the foodstuff including rotating said at least one roller system while conveying the foodstuff through said flattening area such that said at least one outwardly protruding surface structure presses said first conveyor belt towards said impact resistant system causing a compression of the foodstuff,
  wherein said at least one outwardly protruding surface structure is askew in relation to the longitudinal axis of said at least one roller system and is designed such that at least a portion of the at least one outwardly protruding surface structure is in contact with the first conveyor belt substantially at all times during rotation of said at least one roller system. Accordingly, a flattening apparatus is provided where the noise that is produced during operation is greatly reduced which makes the flattening apparatus very user friendly. The roller system may comprise one or more rollers or the like, wherein at least one of said one or more rollers may comprise said at least one outwardly protruding surface structure. As discussed previously, in one embodiment said at least one outwardly protruding surface structure is a single continuous structure designed in a spiral shaped way. In another embodiment, said at least one outwardly protruding surface structure includes two or more separate outwardly protruding surface structures each of which having a first end and a second end, the internal arrangement between adjacent outwardly protruding surface structures being such that a first or a second end of an outwardly protruding surface structure is, in relation to an axis parallel to the longitudinal axis of said at least one roller system, at least in line with a first or a second end of an adjacent outwardly protruding surface structure. In yet another embodiment, said two or more separate outwardly protruding surface structures extend from the opposite ends of said at least one roller system towards the mid-section of said at least one roller system such that, for adjacent outwardly protruding surface structures, a first or a second end of an outwardly protruding surface structure extending from one end of said at least one roller system towards said mid-section is at least in line with a first or a second end of an adjacent outwardly protruding surface structure extending from said mid-section to the opposite end of said roller system.

In one embodiment, said impact resistant system comprises:
  a second conveying means including a second conveyor belt arrange opposed to said first conveying means in a way such that adjacent sides of the first and the second conveyor belts are facing each other and during flattening are moving in the same direction, and
  an impact resistance means arranged adjacent to said second conveyor belt distally away from said first conveyor belt.

In one embodiment, said impact resistance means is a flat plate structure. In another embodiment, said impact resistance means is one or more of said roller system, e.g. one or more rollers or the like arranged with at least one outwardly protruding surface structure. These roller systems would preferably, but not necessarily, rotate in the same direction as a driving wheel that operates the driving of the second conveyor.

In one embodiment, during flattening the peripheral speed of said at least one roller system is larger than the speed of said first and/or second conveyor belts. In that way, it is ensured that while conveying the foodstuff through said flattening area it is ensured that sufficiently many "impact" points/areas on the foodstuff is achieved so as to reach the tenderness of the foodstuff. This may also be adapted to the type of foodstuff since one type of foodstuff may be more sensitive to such "impact" areas than other types of foodstuff.

In one embodiment, said at least one roller system include two roller systems arranged parallel to each other, and where the outwardly protruding surface structure of the two roller systems have opposite twist orientations. It is namely so that during the flattening process a sideward displacement of the food stuff may occur. Therefore, by utilizing two such roller systems the sideward displacement will be leveled out because the foodstuff will more or less move back to the sideward position of where it started.

According to a third aspect of the invention a roller system assembly is provided comprising at least a first and a second sub-roller system each of which comprising at least one outwardly protruding surface structure, said at least first and second sub-roller systems comprising mounting means for mounting said sub-roller systems internally together in a fixed position in relation to each other so as to form said roller system.

According to a fourth aspect, a method is provided of flattening foodstuff using said flattening apparatus.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 3A:
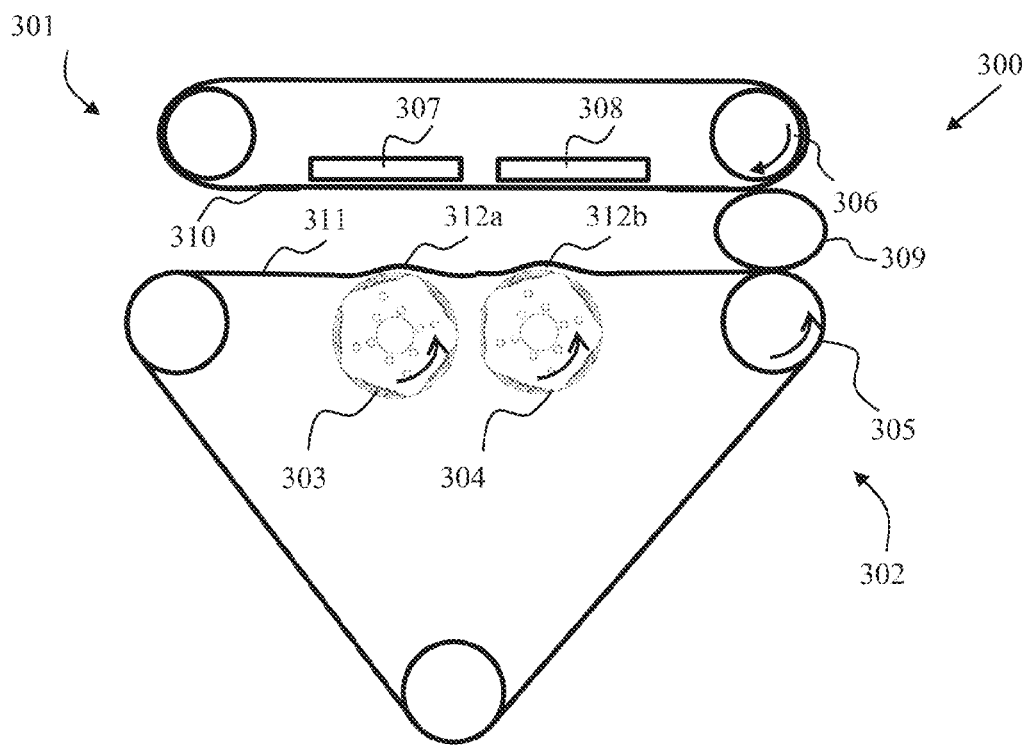

FIG. 3 shows one embodiment of a flattening apparatus 300 according to the present invention for flattening foodstuff 309, where the foodstuff may include, but is not limited to, any types of meat such as beef, lamb, pork, or any type of poultry meat such as chicken or turkey breast, or a fish fillets of any types.

Figure 1A:
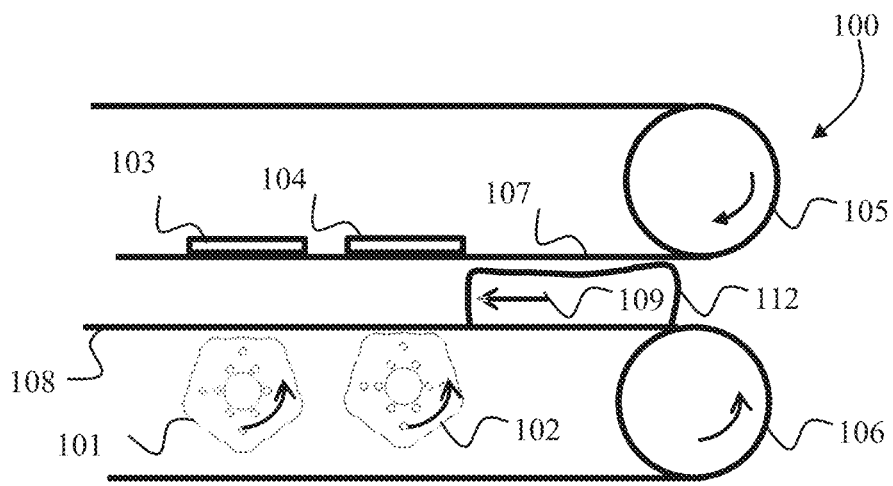
FIGS. 1 shows a prior art flattening apparatus for flattening foodstuff.
Figure 1B:
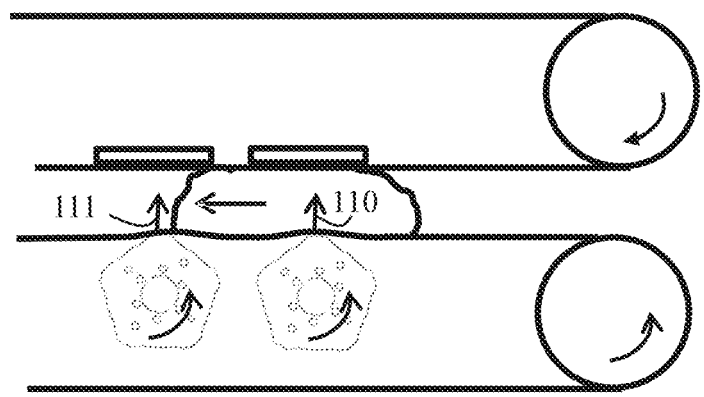
Figure 1C:
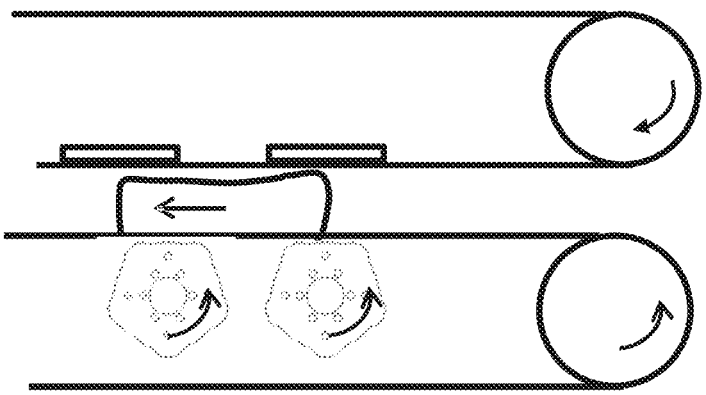
Figure 2A:
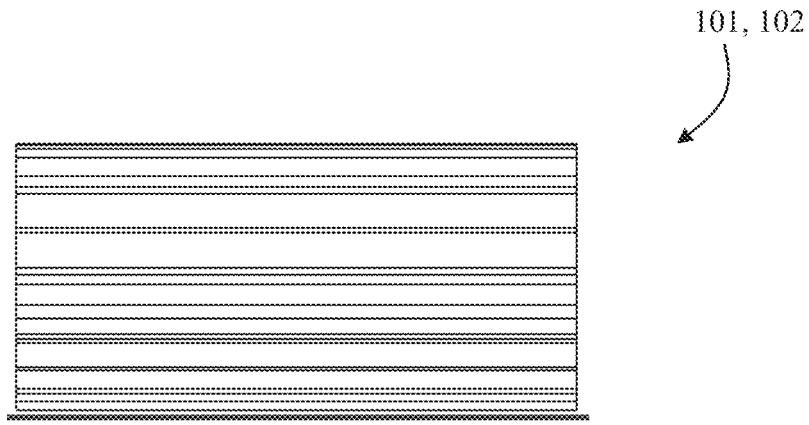
FIG. 2 shows a roller system implemented in the prior art flattening apparatur shown in FIG. 1, FIG. 3a,b shows one embodiment of flattening apparatus according to the present invention for flattening foodstuff.
Figure 2B:
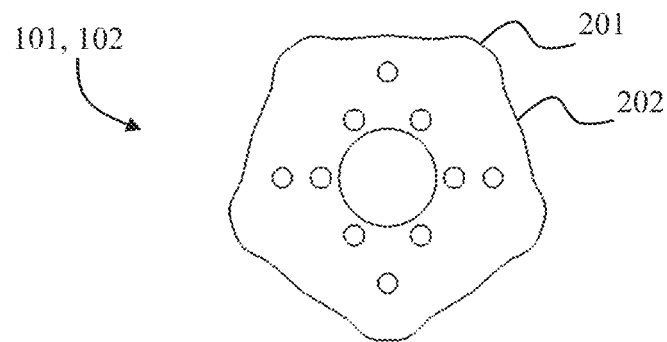
Figure 2C:
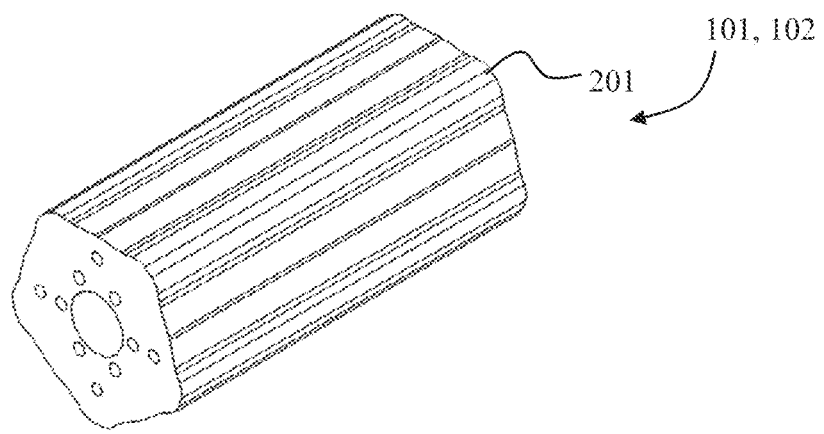

The flattening apparatus 300 comprises an impact resistance system 301, a first conveying means 302 and at least one roller system 303, 304 including at least one outwardly protruding structure that will be discussed in more details later. The first conveying means 302 should not be construed as being limited to the triangular shaped conveying means as shown here, but may just as well be "parallel arranged" similar as depicted in FIG. 1. The at least one roller system 303, 304 may each comprise one or more rollers or the like.

In the embodiment depicted here the impact resistance system 301 is a second conveying means 301 including a second conveyor belt 310 that is arranged opposite to a first conveyor belt 311 of the second conveyor means 301 and where impact resistance means, in this case two flat plate structures 307, 308, are arranged within the same plane opposite to two roller systems 303, 304, respectively, distally away from the first conveyor belt 311.

When flattening the foodstuff 309 driving shafts of the respective first and second conveyor systems are moving in opposite directions as indicated by arrows 305, 306 resulting in that that adjacent parts of the first and the second conveyor belts 310, 311 are moving in the same direction. The two roller systems 303, 304 are rotatable mounted to e.g. driving shafts and positioned side by side within the same plane distally away from the flat plate structures 307, 308 and rotate with a rotational speed that is preferably larger than the rotational speed of the driving shaft of the first conveying means. Although this embodiment shows two roller systems, the roller systems may just as well be a single roller system or three or more roller systems.

As an example, the conveying speed of the first and the second belts, which preferably run with substantially the same speed, may be between 0.06-0.4 m/s, e.g. around 0.24 m/s, and the rotational speed of the roller systems 303, 304 when the largest diameter of the roller systems is 200 mm (including the outwardly protruding structures) may as an example be 70-178 rot./min. Although the roller systems 303, 304 in this embodiment rotate in the same rotational direction as the driving shaft of the first conveying system, the roller systems may just as well rotate in the opposite direction.

Figure 3B:
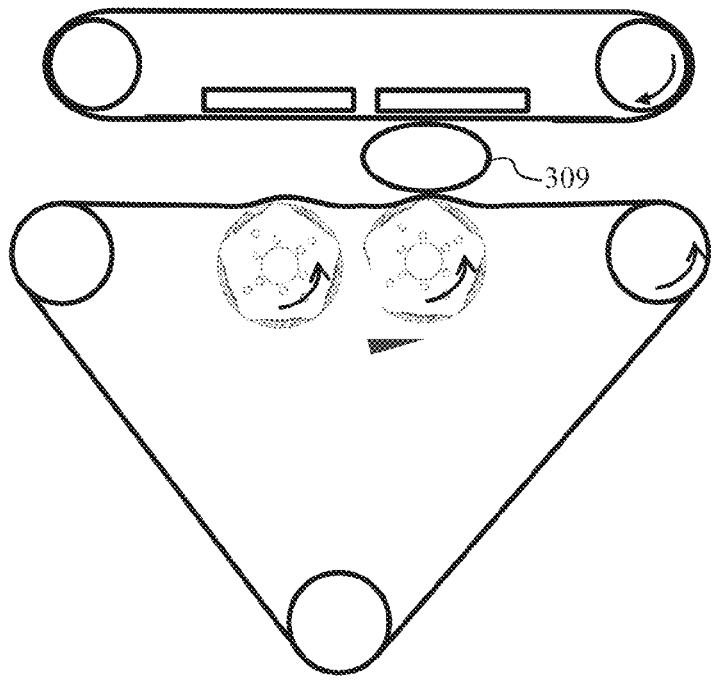

The two roller systems 303, 304 are placed across the first conveyor belt 311 and comprise at least one outwardly protruding surface structure that are askew in relation to the longitudinal axis of the roller system and designed such that at least a portion of the at least one outwardly protruding surface structure is in contact with the first conveyor belt at all times during rotation of the roller systems 303, 304. This continuous contact with the first conveyor belt 311 create, seen from this side view, two uphill portions 312a,b that during movement of the roller systems 303, 304 move continuously across the first conveyor belt 311 such that a contact between the roller systems 303, 304 and the first conveyor belt is maintained at all times. These uphill portions cause a compression of the foodstuff when the foodstuff is conveyed through the flattening area as shown in FIG. 3b. This continuous contact results in enormous noise reduction compared to the prior art flattening apparatus shown in FIG. 1 that gives a lot of "flapping" noise from the belt and also "hammering" forces which results in that the apparatus in FIG. 1 becomes very noise. The design/arrangement of the outwardly protruding surface structure of the roller system in the embodiment shown in FIG. 3 reduces however, or even eliminates these "hammering" forces since at least a portion of the outwardly protruding surface structure is in contact with the first conveyor belt 311 at all times. Furthermore, this design/arrangement has the additional advantage that the machinery, e.g. bearings, drive means, etc. of the apparatus is subjected to less wear than is the case with the prior art flattening apparatus, e.g. due to the reduction or even elimination of the these "hammering" forces.

If the foodstuff is as an example meat, the result of conveying the foodstuff 309 through the flattening area results in that it is flattened which may make it thinner and/or larger and/or to displace the fibres in the meat and partially "fixating" them, which makes the meat more tender and makes a better "bite feeling". Furthermore, by the roller system and the flattening apparatus according to the invention, the foodstuff may be flattened in a manner, which is more gentle as compared to the prior art flattening apparatus, thereby resulting in products having an improved quality.

The flattening process of the foodstuff should not be considered as being limited to the "two step" flattening process shown here where two roller systems 303, 304 are used, but the flattening process may just as well be a "single step" flattening processing or three or more steps flattening process with three or more roller systems (not shown here). Moreover, the distance between the roller systems 303, 304 and the opposite flat plate structures 307, 308 may be different preferably such that distances decrease along the conveying direction which is preferred when food products such as schnitzel is to be flattened out, because such a flattening process can be very difficult in a single flattening process (where only one roller system is present). To achieve this the roller systems 303, 304 may e.g. have different diameters where the diameter of the roller system 303 that is positioned on the downstream side compared to roller system 304 may have larger diameter, or the roller system 303 may simply be adjusted upwards compared to the roller system 304, e.g. by adjusting the roller system 303 towards the flat plate structure 307. Alternatively, the flat plate structure 307 may be adjusted towards the roller system 303. As an example, if the flattening process is a three step flattening process, the first distance between the first roller system and the opposite flat plate structure may be 100 mm, the distance between the next roller system and the opposite flat plate structure may be 60 mm and the third distance between a third roller system and the opposite flat plate structure may be 45 mm.

Figure 4A:
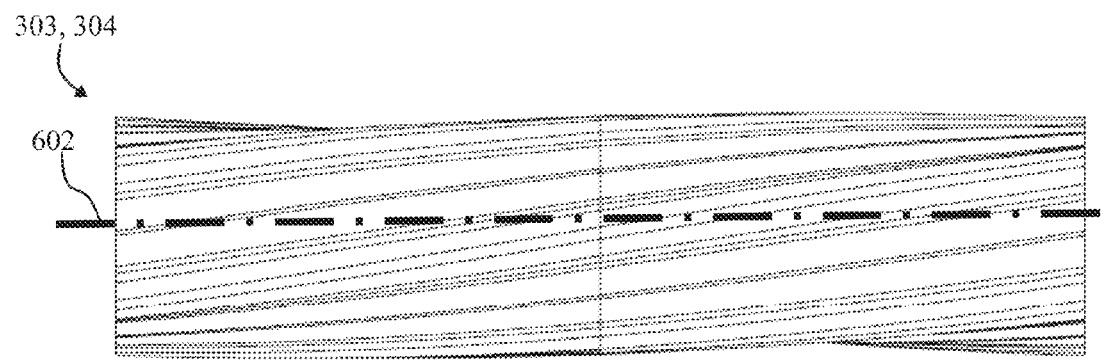
FIG. 4a-c depict a side view, a front view and a perspective view of one embodiment of a roller system according to the present invention.
Figure 4B:
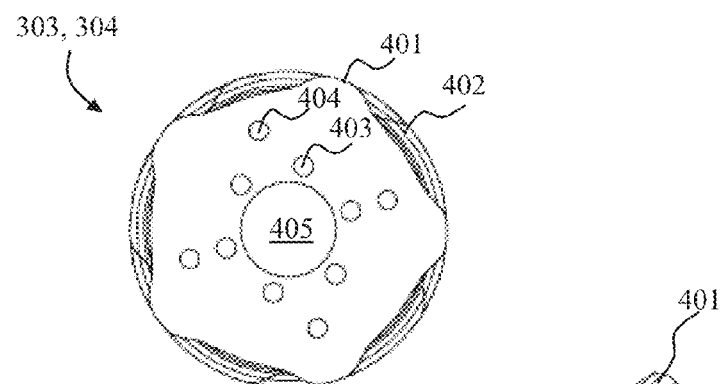
Figure 4C:
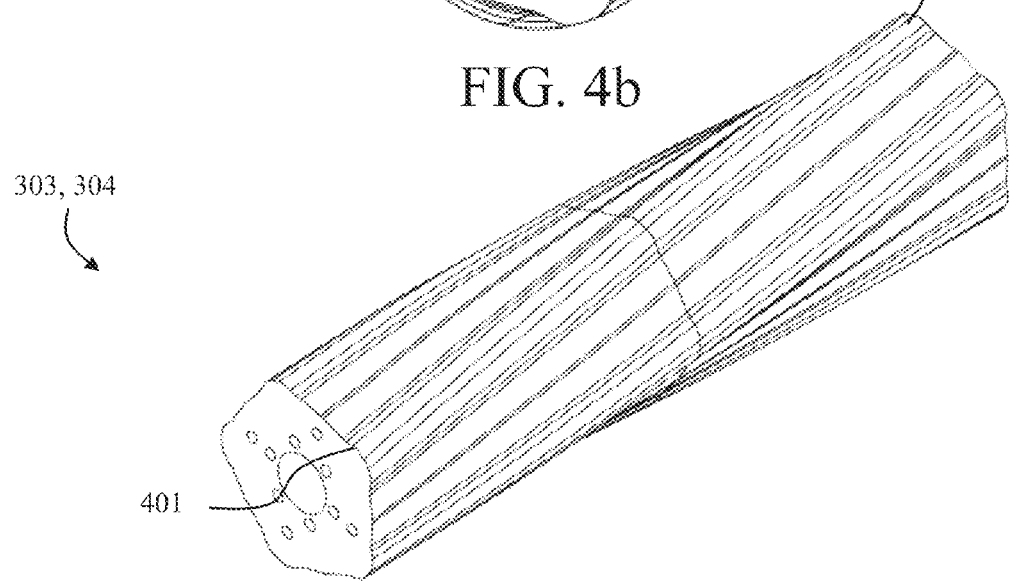

FIG. 4a-c depict a side view, a front view and a perspective view of one embodiment of a roller system 303, 304 according to the present invention, where the at least one outwardly protruding surface structure 401 includes more than one, in this case five, outwardly protruding surface structures extending between the opposite ends of said roller system in a parallel way such that, as shown in FIG. 4b the periphery is substantially circular. Moreover, the internal arrangement between adjacent outwardly protruding surface structures is such that a first end of an outwardly protruding surface structure is, in relation to an axis parallel to the longitudinal axis 602 of said roller system, at least in line with a first or a second end of an adjacent outwardly protruding surface structure. In that way, as discussed in relation to FIG. 3, it is ensured that at least a portion of the outwardly protruding surface structures 401 is in contact with said first conveyor belt at all times.

As shown in this embodiment, the outwardly protruding surface structures 401 are an integral part of the roller system. These outwardly protruding surface structures 401 may just as well be mounted to the surface of a cylinder in a removable manner such that they may be replaced with new outwardly protruding surface structures, or the number of the outwardly protruding surface structures may be adjusted and adapted to the type of foodstuff that is to be flattened. In that way, the number may e.g. be reduced from five to four or less, or be made more than five, e.g. six or seven. The angle of the surface structures in relation to the longitudinal axis of the roller system 300 may then also be adjusted so that the above mentioned requirement, namely that the adjacent surface structures are in line with an axis parallel to the longitudinal axis of the roller system 300 is fulfilled.

The embodiment shown here shows a center hole 405 and the holes 403 closest to the center hole 405 are implemented for mounting the roller system 303, 304 to a mounting shaft (see FIG. 5) that is preferably operable connected to a driving unit (see FIG. 5) that operates the rotational movement of the roller system. The four holes 404 closest to the periphery of the roller system 303, 304 are utilized for rigidly mounting sub-roller systems together so as to form said roller system. As an example, the roller system may be a roller system assembly consisting of two or more roller systems such that, when mounted together, form the above mentioned roller system 303, 304.

Figure 5:
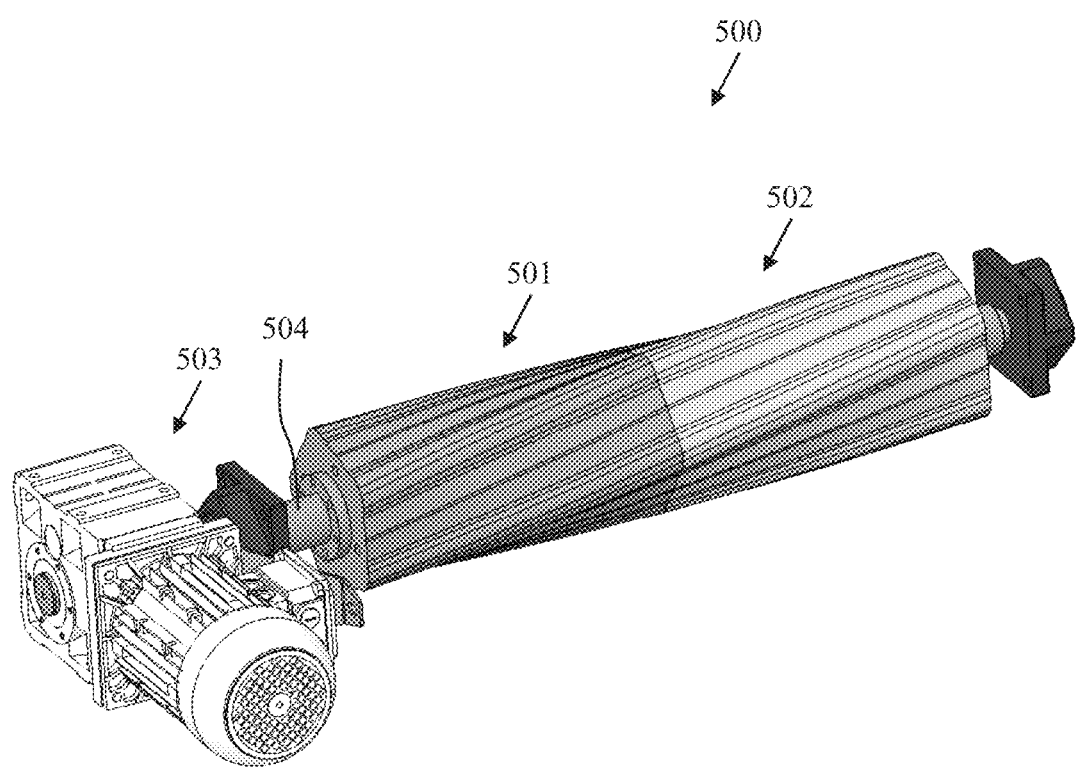
FIG. 5 shows an example of such a roller system assembly consisting of two sub-roller systems that are mounted together as discussed in relation to FIG. 4 and a driving shaft coupled to a driving unit.

FIG. 5 shows an example of such a roller system assembly 500 consisting of two sub-roller systems 501, 502 that are mounted together as discussed in relation to FIG. 4 and a driving shaft 504, where the roller system is driven by a driving unit 503 that operates the rotational speed of the roller system as well as the direction of the rotation of the roller system.

Figure 6:
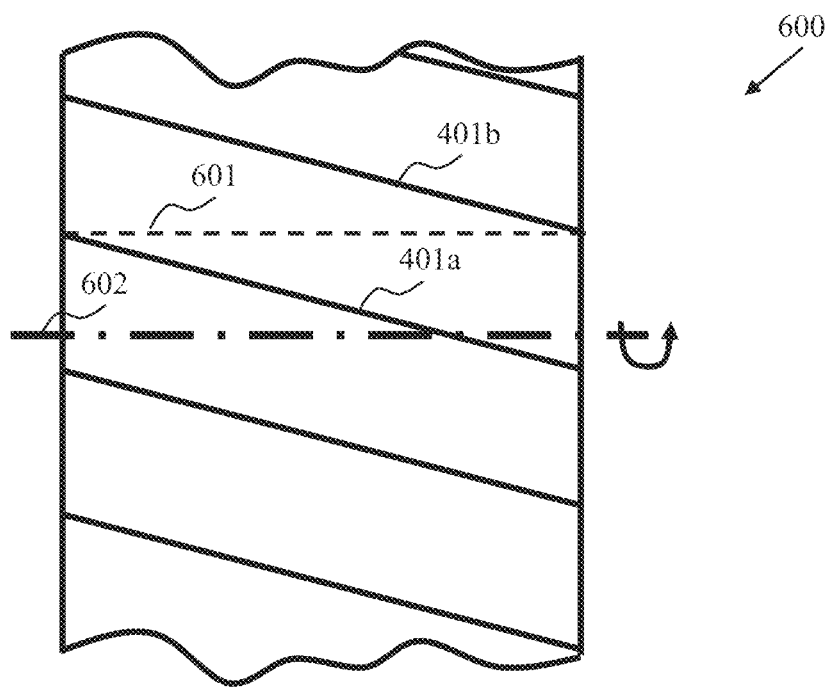
FIG. 6 shows the embodiment from FIG. 4 where the surface structure has been flattened out.

FIG. 6 shows the embodiment from FIG. 4 where the surface structure has, for further clarification, been flattened out, showing where two adjacent outwardly protruding surface structures 401a,b are arranged in a parallel way and designed such that they are in line with an axis 601 being parallel to the longitudinal axis 602 of the roller system. The arrow indicates an example of a rotational direction of the roller system.

Figure 7:
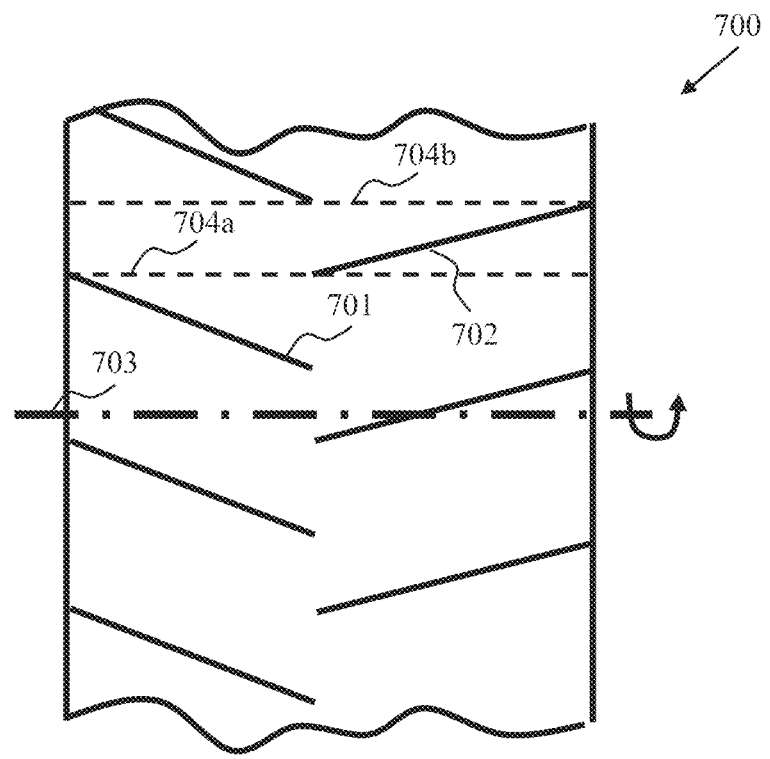
FIG. 7 shows another example of an outwardly protruding structure arrangement where several outwardly protruding surface structures extend from the opposite ends of said roller system towards the mid-section of the roller system.

FIG. 7 shows another example of an outwardly protruding structure arrangement where several outwardly protruding surface structures extend from the opposite ends of said roller system 700 towards the mid-section of the roller system such that, for adjacent outwardly protruding surface structures 701, 702, a first or a second end of an outwardly protruding surface structures extending from one end of the roller system towards said mid-section is at least in line in relation to an axis 704a,b parallel to the longitudinal axis of the roller system 703 with a first or a second end of an adjacent outwardly protruding surface structure extending from said mid-section to the opposite end of said roller system. Or put in other words, the left side and the right side of the outwardly protruding surface structures are parallel, respectively.

It should be noted that several different arrangements of such outwardly protruding surface structures are possible, where the arrangements are such that the roller system maintains a contact with said first conveyor belt at all times.

The outwardly protruding surface structures may further include small wheels so as to reduce the friction between the roller systems and the first conveyor belt, or the outwardly protruding structures may more or less be made of such outwardly protruding wheels.

Also, in an embodiment the at least one outwardly protruding surface structure may include a single continuous structure designed in a spiral shaped way.

Figure 8:
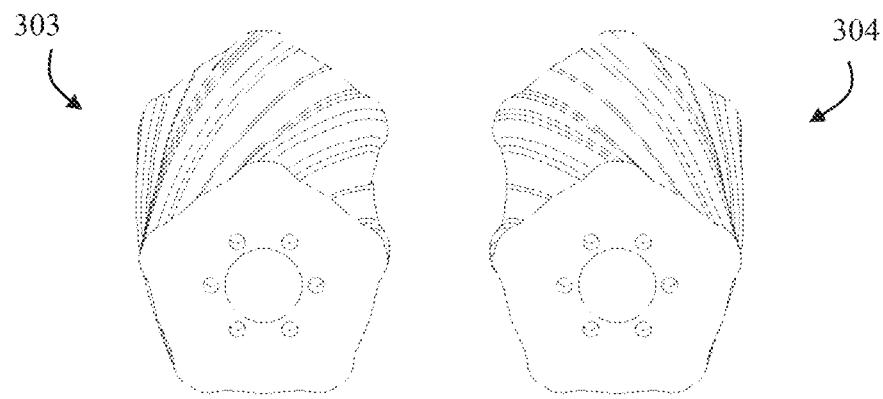
FIGS. 8-10 show one embodiment of a flattening apparatus according to the present invention where two roller systems arranged parallel to each other are utilized.
Figure 9:
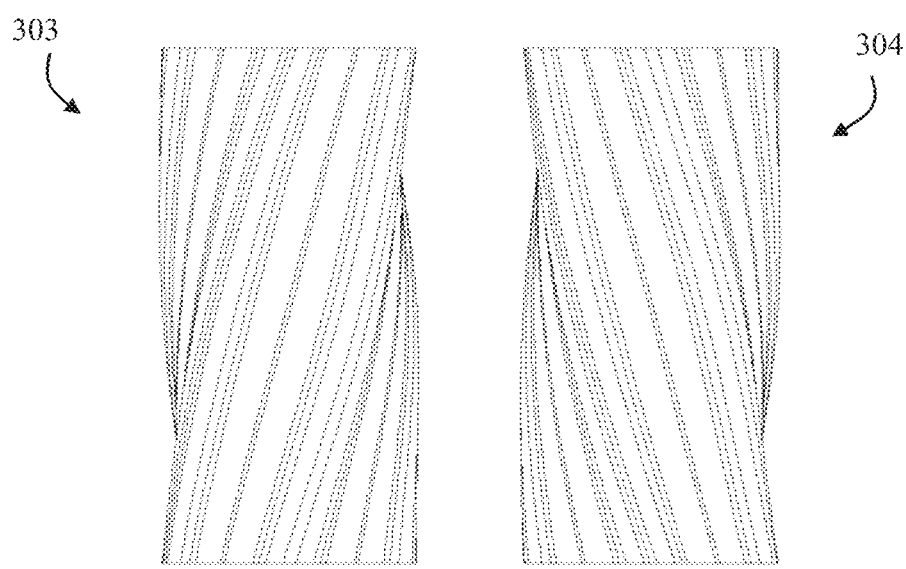
Figure 10:
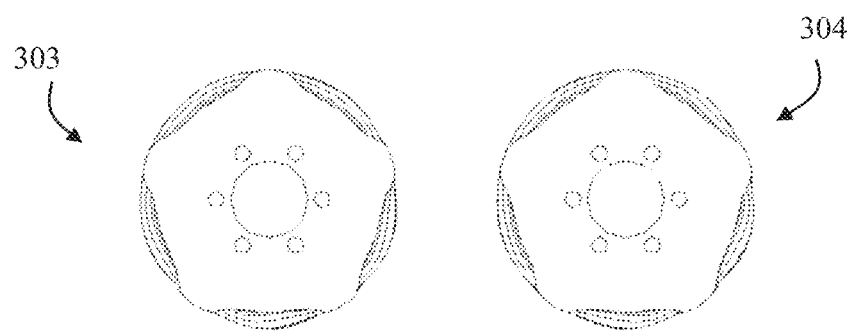

FIGS. 8-10 show a perspective view, a top view and a front view of one embodiment of the roller system arrangement depicted in FIG. 3, where the two roller systems are arranged parallel to each other, and where the outwardly protruding surface structure designed in said spiral shaped way have opposite twist orientations. The foodstuff may namely undergo sideward movement after passing the first roller system due to the spiral shaped arrangement, but by utilizing the second roller system with the opposite twist orientation the foodstuff will more or less move back to the sideward position of where it started. It is accordingly prevented that the foodstuff falls sideways from the conveyor belt 311. As discussed previously, the impact resistance means of the impact resistant system may be one or more of said roller system, e.g. a roller, which may comprise the at least one outwardly protruding surface structure. In the embodiment shown in FIGS. 8-10 such an impact resistance roller may have an opposite twist orientation as compared to the roller system arranged correspondingly below e.g. the first conveyor belt 311, cf. e.g. FIG. 3. Hereby the advantages as discussed above is also achieved, e.g. the prevention of sideways movement.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A flattening apparatus for flattening foodstuff, said flattening apparatus comprising:
    an impact resistant system,
    a first conveyor belt including a first face and an opposite second face, said first conveyor belt being arranged opposite to said impact resistant system with the first face of the first conveyor belt facing said impact resistant system, the area between the first face of the first conveyor belt and the impact resistant system defining a flattening area, and
    two roller systems, each of the roller systems comprising at least one helical outwardly protruding surface structure, each of the roller systems being rotatably mounted adjacent to the second face of said first conveyor belt distally away from said impact resistant system across the first conveyor belt, said flattening of the foodstuff including rotating said roller systems while conveying the foodstuff through said flattening area such that said at least one helical outwardly protruding surface structure contacts the second face of the first conveyor belt and thereby presses the first face of said first conveyor belt towards said impact resistant system causing a compression of the foodstuff within the flattening area,
    wherein said at least one helical outwardly protruding surface structure is askew in relation to a longitudinal axis of the respective one of said roller systems and is designed such that at least a portion of the at least one helical outwardly protruding surface structure is in contact with the second face of the first conveyor belt substantially at all times during rotation of said roller systems,
    wherein said at least one helical outwardly protruding surface structure is designed in a spiral shaped way, and
    wherein said roller systems are arranged below the first conveyor belt and in contact with the second face of the first conveyor belt, one of the roller systems is located downstream from the other roller system, and parallel to each other, and
        wherein the helical outwardly protruding surface structure of the two roller systems have opposite helical twist orientations, such that the twist helical orientation of one of the two roller systems is twisted in a direction opposite from a twisting direction of the other twist helical orientation of the other one of the two roller systems.

2. The flattening apparatus according to claim 1, wherein said at least one helical outwardly protruding surface structure is a single continuous structure designed in said spiral shaped way.

3. The flattening apparatus according to claim 1, wherein said at least one helical outwardly protruding surface structure includes two or more separate helical outwardly protruding surface structures each of which having a first end and a second end, an internal arrangement between adjacent outwardly protruding surface structures being such that a first or a second end of an outwardly protruding surface structure is, in relation to an axis parallel to the longitudinal axis of one of said roller systems, at least in line with a first or a second end of an adjacent outwardly protruding surface structure.

4. The flattening apparatus according to claim 3, wherein each of said two or more separate outwardly protruding surface structures extend between opposite ends of the respective one of said roller systems in a parallel way.

5. The flattening apparatus according to claim 3, wherein said two or more separate outwardly protruding surface structures extend from the opposite ends of the respective one of said roller systems towards the mid-section of said roller system such that, for adjacent outwardly protruding surface structures, a first or a second end of an outwardly protruding surface structure extending from one end of said roller system towards said mid-section is at least in line with a first or a second end of an adjacent outwardly protruding surface structure extending from said mid-section to the opposite end of said roller system.

6. The flattening apparatus according to claim 1, wherein said impact resistant system comprises:
    a second conveyor belt arranged opposite to said first conveyor belt in a way such that adjacent sides of the first and the second conveyor belts are facing each other and during flattening are moving in the same direction, and
    an impact resistance means arranged adjacent to said second conveyor belt distally away from said first conveyor belt.

7. The flattening apparatus according to claim 6, wherein said impact resistance means is a flat plate structure.

8. The flattening apparatus according to claim 1, wherein during flattening, a peripheral speed of said roller systems is larger than the speed of at least one of said first and second conveyor belts.

9. A method of flattening foodstuff using a flattening apparatus, the flattening apparatus comprising:
    an impact resistant system,
    a first conveyor belt including a first face and an opposite second face, said first conveyor belt being arranged opposite to said impact resistant system with the first face of the first conveyor belt facing said impact resistant system, the area between the first face of the first conveyor belt and the impact resistant system defining a flattening area, and
    two roller systems, each of the roller systems comprising at least one helical outwardly protruding surface structure, each of the roller systems being rotatably mounted adjacent to the second face of said first conveyor belt distally away from said impact resistant system across the first conveyor belt, said flattening of the foodstuff including rotating said roller systems while conveying the foodstuff through said flattening area such that said at least one helical outwardly protruding surface structure contacts the second face of the first conveyor belt and thereby presses the first face of said first conveyor belt towards said impact resistant system causing a compression of the foodstuff within the flattening area, wherein said at least one helical outwardly protruding surface structure is askew in relation to a longitudinal axis of and is designed such that at least a portion of the at least one helical outwardly protruding surface structure is in contact with the second face of the first conveyor belt substantially at all times during rotation of said roller systems, wherein said at least one helical outwardly protruding surface structure is designed in a spiral shaped way, and wherein said roller systems are arranged below the first conveyor belt and in contact with the second face of the first conveyor belt, one of the roller systems is located downstream from the other roller system, and parallel to each other, and wherein the helical outwardly protruding surface structure of the two roller systems have opposite helical twist orientations, such that the twist helical orientation of one of the two roller systems is twisted in a direction opposite from a twisting direction of the other twist helical orientation of the other one of the two roller systems.

* * * * *